(12) United States Patent
Enright

(10) Patent No.: US 7,555,783 B2
(45) Date of Patent: Jun. 30, 2009

(54) WIRELESS NETWORK CREDENTIAL PROVISIONING

(75) Inventor: Mark Enright, Soquel, CA (US)

(73) Assignee: Cisco Technology, Inc., San Jose, CA (US)

( * ) Notice: Subject to any disclaimer, the term of this patent is extended or adjusted under 35 U.S.C. 154(b) by 846 days.

(21) Appl. No.: 11/041,123

(22) Filed: Jan. 21, 2005

(65) Prior Publication Data

US 2006/0171537 A1    Aug. 3, 2006

(51) Int. Cl.
*H04L 9/32* (2006.01)
*H04L 9/00* (2006.01)
*G06F 7/04* (2006.01)
*G06F 11/30* (2006.01)

(52) U.S. Cl. ............... 726/27; 726/3; 726/4; 726/5; 726/6; 713/168; 713/169; 713/170; 713/171; 713/172; 380/270; 380/249

(58) Field of Classification Search ............... 726/27
See application file for complete search history.

(56) References Cited

U.S. PATENT DOCUMENTS

| | | | |
|---|---|---|---|
| 5,657,390 A | * | 8/1997 | Elgamal et al. ............ 713/151 |
| 6,542,491 B1 | * | 4/2003 | Tari et al. ............... 370/338 |
| 7,096,352 B2 | * | 8/2006 | Kang et al. ............... 713/152 |
| 2001/0016907 A1 | | 8/2001 | Kang et al. |
| 2004/0076300 A1 | | 4/2004 | Ishidoshiro |
| 2005/0149204 A1 | * | 7/2005 | Manchester et al. ........... 700/1 |

FOREIGN PATENT DOCUMENTS

WO    PCT/US2005/047323    12/2005

OTHER PUBLICATIONS

PCT Search Report.

* cited by examiner

*Primary Examiner*—Longbit Chai
(74) *Attorney, Agent, or Firm*—Haynes & Boone, LLP.

(57) ABSTRACT

A credential provisioning technique is provided that is secure yet easy to administer. A credential provisioner such as a network AP is configured to leave a secure mode of operation and allow open authentication with a wireless supplicant. After open authentication is established, the wireless supplicant requests credential provisioning. In response, the credential provisioner supplies the supplicant with an encrypted password. To prevent unauthorized access, the supplicant again requests credential provisioning but also proves knowledge of the encrypted password. At least one credential is supplied to the wireless supplicant in response to the proof only if a waiting period expires with just one request for credential provisioning being received by the credential provisioner.

23 Claims, 3 Drawing Sheets

WIRELESS NETWORK CREDENTIAL PROVISIONING

TECHNICAL FIELD

This invention relates generally to networks, and more particularly to the provisioning of credentials to a wireless supplicant for secure wireless network access.

BACKGROUND

Security issues such as preventing unwelcome network interlopers or hackers are more pronounced in wireless networks. Whereas a wired network can secure its network attachment points in locked offices, the transmission medium is available to anyone with an antenna in a wireless network. To prevent unauthorized network access, a number of mechanisms have been developed for wireless network access control. In this control, a network port or node takes one of two roles: authenticator or supplicant. The supplicant seeks network access from the authenticator (typically, the network's access point (AP)). The authenticator enforces authentication according to some protocol. For example, the 802.11 specification stipulates two mechanisms for authenticating wireless LAN clients: open authentication and shared key authentication.

Open authentication is a bit of a misnomer as it refers to a default state in which a wireless network's access point (AP) will grant any request for authentication it receives. The sole "authentication" applied during open authentication is that the wireless supplicant supplies its MAC address. In addition, a wireless supplicant seeking authentication must have the network's Service Set Identifier (SSID). Because the SSID is easily "sniffed" by wireless interlopers, open authentication provides very little security for a wireless network.

Another authentication mechanism stipulated by the 802.11 specification is shared key access. Under shared key access, a wireless supplicant proves knowledge of a shared secret key before an AP grants network access. Because a network administrator or user must configure the supplicant with the secret key, implementation of shared key access is cumbersome. In addition, the transmission of the secret key by the wireless supplicant to the authenticator/AP may be compromised by "man-in-the-middle" and other sophisticated hacking techniques.

To address these weaknesses in the authentication mechanisms stipulated in the 802.11 specification, more powerful authentication frameworks are defined by the 802.1x specification. In general, the wireless supplicant is required to establish an authorized identity in these authentication techniques. Having established its identity, the wireless supplicant may then be provisioned with the security parameters needed to access the network. Although these more refined authentication techniques provide better network security, the credential provisioning by the authenticator/credential provisioner tends to be burdensome to administrate. To avoid this burden on users and network administrators, some wireless security systems use a power limitation during the credential provisioning process that requires the wireless supplicant to be within a restricted range of the provisioner. But such power limitation approaches are impractical for relatively heavy and immobile wireless supplicants such as wireless printers. Accordingly, there is a need in the art for improved wireless network credential provisioning procedures that provide enhanced network security yet are simple to administer.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Figure 1:
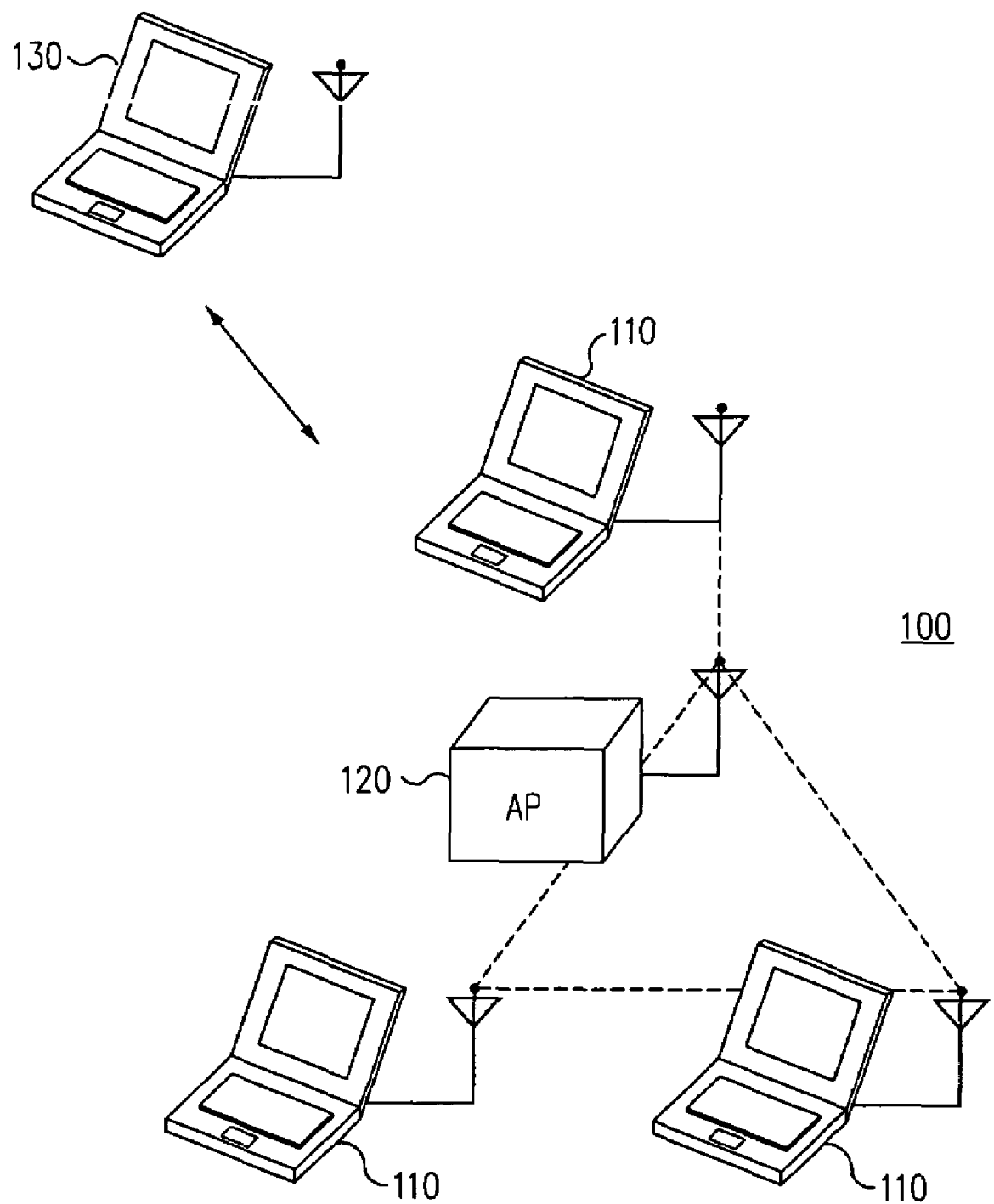
FIG. 1 illustrates a wireless network including an access point configured to receive credentials from a wireless supplicant according to an embodiment of the invention.

A credential provisioning system is described that automates the provisioning of credentials to a wireless supplicant in a simple yet highly secure fashion. This system may be described with regard to an exemplary wireless network 100 as illustrated in FIG. 1. Network 100 is an infrastructure network in that communications between nodes 110 are coordinated through an access point (AP) 120. Any suitable wireless networking protocol may be implemented on network 100 such as an 802.11 protocol. Within network 100, only AP 120 need be configured to practice the credential provisioning method described further herein. However, it will be appreciated that the present invention may also be implemented in independent networks that do not include an AP. In an independent network, each node could be configured to practice the disclosed credential provisioning method. A wireless supplicant 130 seeking credentials from AP 120 will also be configured to practice the credential provisioning methods described herein.

The credentials supplied by AP 120 to wireless supplicant 130 allows the wireless supplicant to communicate with the AP 120 using an encryption protocol being enforced on network 100. Having been supplied with the necessary credentials, wireless supplicant 130 may then proceed to formerly authenticate itself with AP 120 to gain full network access. Examples of suitable encryption protocols being enforced on network 100 include wired equivalent privacy (WEP), WiFi Protected Access Pre-Shared Key (WPA-PSK), and WPA-Radius. AP 120 may support several such encryption schemes. Regardless of the particular encryption(s) implemented on AP 120, its encrypted operation will be denoted herein as a "secure mode." In general, for wireless supplicant 130 to communicate in a secure mode with AP 120, wireless supplicant will need to be provisioned with credentials such as a security key, password, or X.509 certificates. However, as discussed previously, the provisioning of credentials typically burdens users. For example, a network administrator may have to manually enter a password onto a wireless supplicant before it may be provisioned with credentials for network access. To avoid such burden, AP 120 and wireless supplicant 130 may be configured to practice the following credential provisioning method.

For ease of use, the credential provisioning may be initiated by a simple button press at the AP 120. The button press may be hardwired or software-enabled. After the button press, AP 120 leaves its secure mode of operation and enters an open access mode such that it will respond to any wireless supplicant requests for association. It will be appreciated that during this open access mode, AP 120 may continue to operate in a secure mode with nodes 110 that have already gained network access should AP 120 support operation under multiple SSIDs. Thus, even though wireless supplicant 130 may freely associate with AP 120 during open access mode operation, wireless supplicant 130 must still be provisioned with network security parameters before it may gain secure network access. However, during open access mode operation, AP 120 will respond to wireless association requests by any supplicant. For example, if network 100 is an 802.11 network, wireless supplicant 130 need only supply a known SSID to AP 120 to become associated during open access.

Because AP 120 will respond to any requests for association during open access, a wireless interloper could attempt to be provisioned with credentials. To prevent unauthorized credential provisioning, AP 120 enforces a waiting period during open access. Upon receiving a request for provisioning of credentials, AP 120 begins the waiting period and may instruct wireless supplicant 130 regarding the length of this waiting period. Because the button press was performed since wireless supplicant 130 desires access to network 100, it may be presumed that wireless supplicant 130 will associate and request for credentials after this button press. If any additional requests for credentials (which may be denoted as requests for network access) are received during the waiting period enforced by AP 120, the presence of an interloper is established in that either the interloper made the initial request for access which started the waiting period or the interloper made the subsequent request for access during the waiting period. Regardless of when the interloper made the request for credentials, AP 120 may then terminate the open access mode, resume secure mode operation, and notify a network administrator or user of the attempted unauthorized access to network credentials. If, however, no other requests for access are received during the waiting period, it may be safely assumed that the request for access received from wireless supplicant 130 is an authorized request for provisioning with credentials. In this fashion, wireless supplicant 130 implicitly proves its identity despite the use of open authentication.

Although wireless supplicant 130 has implicitly proven its identity, a wireless interloper could intervene after the waiting period expires and request to be provisioned with credentials. AP 120 could then be fooled by this request and respond with the credentials necessary for the wireless interloper to gain secure network access. To prevent such a security breach, AP 120 provides a unique password to wireless supplicant 130 in response to the request for network access that initiated the waiting period. At the first request by wireless supplicant 130 to be provisioned with credentials (subsequent to its open authentication), AP 120 provides a password to the supplicant and instructs the supplicant to wait for the waiting period to expire. Upon the expiration of the waiting period, wireless supplicant 130 again requests to be provisioned with credentials except that it also provides the password.

Note that wireless supplicant 130 has first authenticated its identity implicitly in that it is the only supplicant requesting to be provisioned with credentials during the waiting period. It then authenticates its identity explicitly by supplying the password it received from AP 120 at the initiation of the waiting period. In this fashion, wireless supplicant 130 authenticates its identity so that it may be provisioned with network credentials without requiring intervention from a user or network administrator. However, a wireless interloper could listen for the provision of the password to wireless supplicant 130 and then attempt to use this password to gain unauthorized credential provisioning.

To prevent such unauthorized access, the provision of the password to and from wireless supplicant 130 should be encrypted. Any suitable encryption scheme may be utilized for this encryption. Network security is increased, however, if a shared secret encryption scheme is avoided. In this fashion, wireless supplicant 130 need not be configured with the shared secret, thereby easing burden on users and network administrators.

A particularly convenient encryption scheme is the Secure Sockets Layer (SSL) protocol. Because SSL uses the TCP/IP protocol, wireless supplicant 130 will need an IP address as well as the IP address for AP 130 to establish an SSL "tunnel" for credential provisioning. Given the prevalence of Dynamic Host Configuration Protocol (DHCP) enabled APs, a particularly convenient way to obtain the IP address is to use DHCP messages. Thus, subsequent to open association with AP 120, wireless supplicant 130 may initiate the authentication process by broadcasting a DHCP Discover frame. AP 120 may respond with a DHCP Offer frame, which will contain the offer of an IP address to wireless supplicant 130. Wireless supplicant 130 may respond with a DHCP Request frame, which selects for the IP address offer. AP 120 then responds with a DHCP ACK frame, acknowledging the selection of the IP address by wireless supplicant 130.

Wireless supplicant 130 may then process the DHCP ACK message to retrieve the IP address for AP 120. At this point, wireless supplicant 130 and AP 120 may proceed to use SSL to provide the password to wireless supplicant 130 upon the initial request for credential provisioning. After the expiration of the waiting period, wireless supplicant 130 and AP 120 may again use SSL to supply the password back to AP 120 in combination with a another request for credential provisioning. AP 120 may then provision wireless supplicant 130 with the necessary credentials using SSL such that wireless supplicant 130 gains network access in secure mode. Wireless supplicant 130 may then begin secure mode communication with AP 120 and thus network with other nodes 110.

Encrypted messages are thus used to supply a password to and from wireless supplicant 130 for the authentication of the wireless supplicant's identity as well as to provision credentials to wireless supplicant 130 so that it may gain network access. As just discussed, SSL is a convenient encryption technique to use for these messages but other encryption schemes may also be employed. This encryption is distinct from the encryption being practiced on network 100 during secure mode operation. If AP 120 supports multiple encryption protocols in the secure mode, AP 120 may allow wireless supplicant 130 to select for the appropriate credentials for the encryption protocol it desires to operate in. The corresponding credentials would then be provisioned pursuant to embodiments of the credential provisioning technique described herein.

Figure 2:
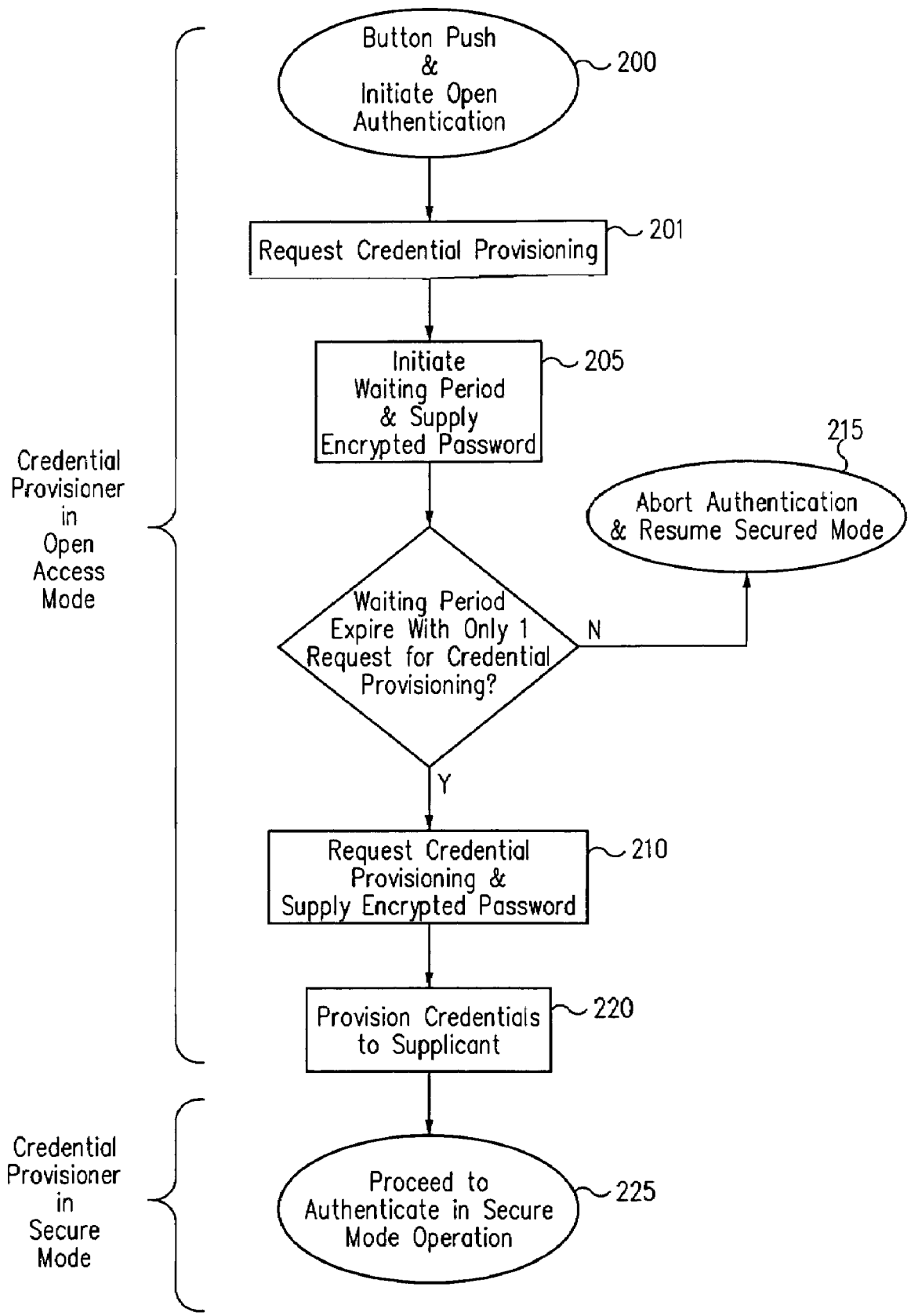
FIG. 2 is a flowchart illustrating a credential provisioning method implemented between an authenticator and a wireless supplicant according to an embodiment of the invention.

A flowchart illustrating an exemplary credential provisioning method is shown in FIG. 2. The method begins with a button push 200 for the authenticator/credential provisioner on a network that a wireless supplicant desires access. Should the network be infrastructure network 100, the provisioner may be AP 120. Alternatively, if the network is an independent network that does not include APs, the credential provisioner would be any node on the network. The following discussion will assume the credential provisioner is an AP without loss of generality. Button push 200 may be either hardware or software implemented and simply indicates that a credential provisioning process should be initiated with the wireless supplicant. The credential provisioner/AP would leave a secure mode of operation at that point and allow open access. The wireless supplicant associates with the AP under open authentication and requests to be provisioned with credentials for secure network access at step 201. Upon receiving the request for credential provisioning from the wireless supplicant, the AP instructs the wireless supplicant to wait through a waiting period at step 205 and also supplies a password. Should the waiting period expire with no additional requests for credential provisioning being received at the AP, the method resumes with step 210. However, if an additional request for credential provisioning is received while the waiting period is still pending, the presence of a wireless interloper may be presumed. Thus, the method would abort at step 215 and the AP would resume the secure mode of operation. In addition, a network administrator may be informed of the attempted unauthorized credential provisioning.

At step 210, the wireless supplicant sends an encrypted message to the AP that again requests for credential provisioning but also supplies the password. It will be appreciated that the password per se need not be provided in that the wireless supplicant need merely prove knowledge of the password. Having thus authenticated its identity, the wireless supplicant may then be provisioned with credentials using encrypted messages at step 220. As discussed previously, the SSL protocol may be used among other encryption techniques for steps 205 and 210. If the SSL protocol is used, the wireless supplicant will need an IP address as well as an IP address for the AP. DHCP is a convenient way to provide these addresses to the wireless supplicant. After the wireless supplicant has been provisioned with the necessary credentials, it may by authenticated in a secure mode of operation on the network at step 225. It will be appreciated that this method assumes that a request for credential provisioning occurs in step 201. If no request for credential provisioning is ever provided after a sufficient waiting period, the AP would abort the credential provisioning process and resume secure mode operation as discussed with respect to step 215.

Figure 3:
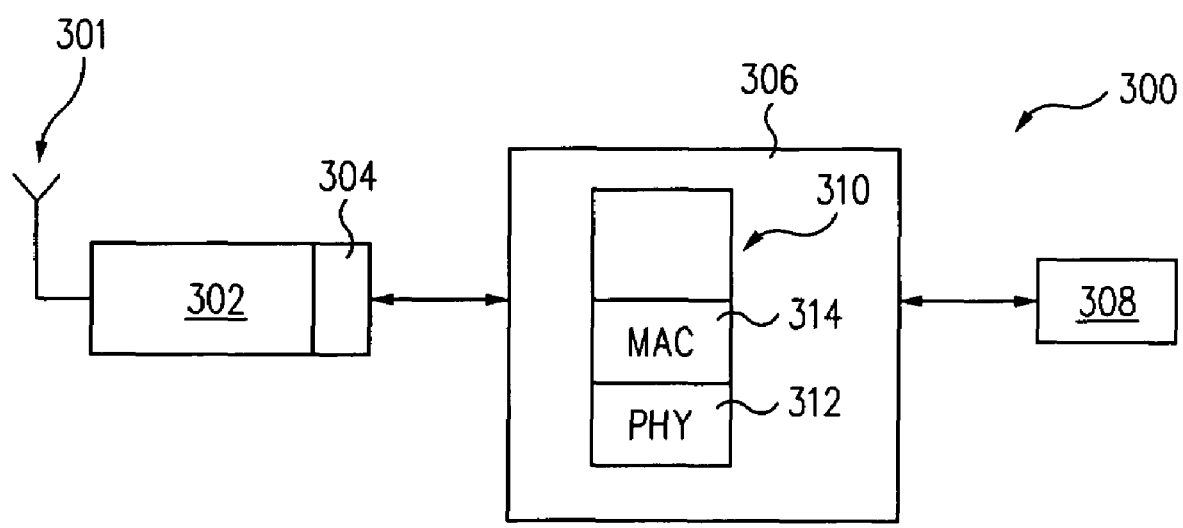
FIG. 3 is a block diagram of a wireless station according to an embodiment of the invention.

Turning now to FIG. 3, a block diagram of a generic wireless station 300 for implementing the credential provisioning technique described herein is illustrated. Wireless station 300 represents either AP 120 or wireless supplicant 130 according to an embodiment of the invention. Wireless station 300 includes an antenna 301, a wireless transceiver 302 having baseband and RF circuitry, interface circuitry 304, a processor 306, and a memory 308. Transceiver 302 provides and accepts MAC frames to/from a protocol stack 310 in processor 306. Memory 308 may include volatile memory, e.g., DRAM, and non-volatile memory, e.g., SRAM. Protocol stack 310 includes a network layer comprising an 802.11 PHY layer 312 and an 802.11 MAC layer 314. Processor 306 is configured to practice the credential provisioning method discussed with respect to FIG. 2.

Those of ordinary skill in the art will appreciate the ease of use for the credential provisioning method described herein. This method does not depend upon the encryption used to support a secure mode of operation on the network upon which the wireless supplicant will be provisioned with credentials for access. Indeed, the network may support several types of encryption such that the wireless supplicant may select the most appropriate form for its secure mode of operation. In such an embodiment, step 220 could include a transmission by the AP to the wireless supplicant of the available encryption schemes on the network. The AP could then select its desired scheme whereupon the AP could then provide the appropriate encrypted credentials. For example, the credentials may comprise a x.509 certificate, a shared password in the case of WPA and similar security protocols, or a security parameter such as a WEP key.

Credential provisioning is made automatic because the wireless supplicant associates under open authentication. Despite the use of open authentication, the identity of the wireless supplicant is inherently authenticated through the use of the waiting period. This identity is then explicitly confirmed through the provision of the password. Having established its authorized identity, the wireless supplicant may then be provisioned with the credentials necessary for it to access the network in a secure mode of operation. Because this provisioning occurs wirelessly and automatically using encrypted messages, the provisioning of security credentials does not burden a network administrator.

Although the invention has been described with respect to particular embodiments, this description is only an example of the invention's application and should not be taken as a limitation. For example, the button press to initiate the credential provisioning process could be made more elaborate at the cost of greater user involvement. In addition, the AP could be configured with a graphical user interface or other type of interface that allows an administrator to explicitly confirm or deny a wireless supplicant that has passed the credential provisioning method described herein. Consequently, the scope of the invention is set forth in the following claims.

I claim:

1. A wireless network access point (AP) configured to communicate with network nodes using a secure mode of operation, comprising:
   a wireless transceiver; and
   a processor configured to provide credentials to a wireless supplicant using the wireless transceiver, the processor being configured to respond to a first credential provisioning request from the wireless supplicant by leaving the secure mode of operation and communicating with the wireless supplicant under open authentication, the processor being further configured to respond to the first credential provisioning request by supplying a password to the wireless supplicant using a first encrypted message, the processor being further configured to supply at least one credential to the wireless supplicant using a second encrypted message in response to a second credential provisional request from the wireless supplicant supplying the password after expiration of a waiting period if the waiting period expires with the processor receiving only the first credential provisioning request such that the wireless supplicant receives said at least one credential to securely authenticate with the AP.

2. The wireless network AP of claim 1, wherein the secure mode of operation includes Wifi Protected Access (WPA) operation.

3. The wireless network AP of claim 1, wherein the secure mode of operation includes Wired Equivalent Privacy (WEP) operation.

4. The wireless network AP of claim 1, wherein the processor is further configured to initiate the waiting period upon receipt of the first credential provisioning request.

5. The wireless network AP of claim 4, wherein the processor is further configured to communicate the waiting period initiation to the wireless supplicant using the first encrypted message.

6. The wireless network AP of claim 4, wherein processor is further configured to allow open authentication upon leaving the secure mode of operation.

7. The wireless network AP of claim 1, wherein the encryption used for the encrypted messages is a Secure Socket Layer (SSL) encryption.

8. The wireless network AP of claim 7, wherein the AP is a Dynamic Host Configuration Protocol (DHCP) server, the processor being further configured to supply the wireless supplicant with an IP address using the DHCP protocol to support the SSL encryption.

9. The wireless network AP of claim 1, wherein the processor is further configured to respond to a second credential provisioning request while the waiting period has not expired by resuming the secure mode of operation such that the wireless supplicant is not authenticated with the AP.

10. The wireless network AP of claim 9, wherein the processor is further configured to respond to the second credential provisioning request while the waiting period has not expired by notifying a network administrator of an attempted unauthorized credential provisioning.

11. A wireless supplicant, comprising:
   a wireless transceiver; and
   a processor configured to request credential provisioning from an access point (AP) using the wireless transceiver, the processor being configured to request a first credential provisioning by associating with the AP using open authentication, the processor being further configured to receive an encrypted password from the AP in response to the first request, the processor being further configured to request a second credential provisioning using an encrypted message that also proves knowledge of the password, the processor issuing the second request after expiration of a waiting period specified by the AP such that the processor receives at least one credential to securely authenticate with the AP if the waiting period expires with the AP only receiving the first request.

12. The wireless supplicant of claim 11, wherein the processor is further configured to respond to open authentication with the AP by issuing a DHCP discover frame to the AP, selecting its IP address by responding to a DHCP offer frame from the AP with a DHCP request frame, and determining an IP address for the AP using an DHCP ACK frame from the AP.

13. The wireless supplicant of claim 11, wherein the at least one credential is a Wifi Protected Access (WPA) security parameter.

14. The wireless supplicant of claim 11, wherein the encryption is Secure Socket Layer (SSL) encryption.

15. A wireless network access point (AP) configured to communicate with network nodes using a secure mode of operation, comprising:
   a wireless transceiver; and
   means for supplying at least one credential to a wireless supplicant using the wireless transceiver, the means being configured to respond to an indication that the wireless supplicant desires credential provisioning by leaving the secure mode of operation and communicating with the wireless supplicant under open authentication, the means being further configured to respond to a first credential provisioning request from the wireless supplicant by supplying a password to the wireless supplicant using a first encrypted message, the means being further configured to supply said at least one credential to the wireless supplicant using a second encrypted message in response to a second credential provisional request from the wireless supplicant supplying the password after expiration of a waiting period if the waiting period expires with the AP receiving only the first credential provisioning request such that the wireless supplicant receives said at least one credential to securely authenticate with the AP.

16. A method of provisioning credentials from a wireless network access point (AP) to a wireless supplicant so that the wireless supplicant accesses the network in a secure mode of operation, comprising:
   receiving an indication at the AP that the wireless supplicant desires credential provisioning;
   responsive to the indication, leaving the secure mode of operation and allowing open authentication at the AP;
   receiving a first request for credential provisioning from the wireless supplicant under open authentication;
   initiating a waiting period;
   responsive to the first request, supplying the wireless supplicant with a password using encryption;
   if the waiting period expires with only the first request for credential provisioning being received by the AP, the method including the additional acts of:
   receiving a second request for credential provisioning from the wireless supplicant under open authentication, the wireless supplicant's additional request proving knowledge of the password using the encryption; and
   in response to the proof, provisioning at least one credential to the wireless supplicant using the encryption, wherein the at least one credential enables the wireless supplicant to gain secure network access.

17. The method of claim 16, wherein the encryption is SSL encryption.

18. The method of claim 16, further comprising: using DHCP frames to provide the wireless supplicant with an IP address.

19. A method of requesting credential provisioning for a wireless supplicant from a wireless network access point (AP) so that the wireless supplicant accesses the network in a secure mode of operation, comprising:
   transmitting a first request for credential provisioning to the AP under open authentication;
   responsive to the first request, receiving at the wireless supplicant a password using a first encrypted message, the first encrypted message also supplying a waiting period;
   after expiration of the waiting period, transmitting a second request for credential provisioning to the AP using a second encrypted message, the second encrypted message also proving knowledge of the password, and
   in response to the proof, receiving at least one credential at the wireless supplicant using a third encrypted message if the waiting period expires with the AP receiving only the first request, wherein the at least one credential enables the wireless supplicant to gain secure network access.

20. The method of claim 19, wherein the first, second, and third encrypted messages are SSL encrypted messages.

21. The method of claim 19, further comprising: using DHCP frames to provide the wireless supplicant with an IP address.

22. The method of claim 19, further comprising: using DHCP frames to provide the wireless supplicant with an IP address for the AP.

23. The method of claim 19, further comprising: using DHCP frames to provide the wireless supplicant with an IP address for the AP.

* * * * *